United States Patent Office 3,417,086
Patented Dec. 17, 1968

3,417,086
2,6-DIALKYL MORPHOLINOTHIO CARBONYL-AMINO SULFIDES AND AMINO THIOCAR-BONYL - 2,6-DIALKYLAMINO MORPHOLINO-SULFIDES
George E. P. Smith, Jr., Akron, and Wendell S. Cook, Canal Fulton, Ohio, assignors to The Firestone Tire & Rubber Company, Akron, Ohio, a corporation of Ohio
No Drawing. Filed Sept. 21, 1964, Ser. No. 398,085
6 Claims. (Cl. 260—247.1)

ABSTRACT OF THE DISCLOSURE 2,6-dialkylmorpholino thiocarbonylamino sulfides and aminothio carbonyl-2,6-dialkylmorpholino sulfides are useful as vulcanization accelerators of rubber. The compounds are prepared by oxidizing with an oxidizing agent a mixture of a dithiocarbamate salt and an amine having a hydrogen atom attached to the nitrogen.

---

The present invention relates to new chemical compounds and the application of these compounds in the vulcanization of diene rubbers by sulfur and sulfur-donors.

The accelerators are of the thiocarbonyl sulfide type, sometimes referred to as the thiocarbonyl hydrosulfamine type, and are found unexpectedly to be among the highest melting, most stable and most scorch-resistant accelerators of this type. They contain a 2,6-dialkyl morpholino group and are higher melting, more stable and more scorch resistant than the corresponding thiocarbonyl sulfides containing the unsubstituted morpholino group. The accelerators are advantageously obtained by oxidizing an amine in the presence of the sodium or other salt of the N-substituted dithiocarbamic acid.

The accelerators have the formula

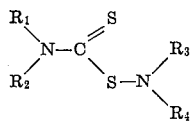

in which either

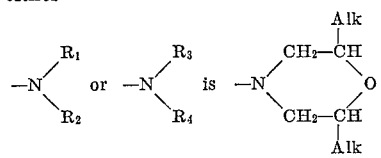

in which Alk stands for an alkyl group of 1 to 2 carbon atoms. Where

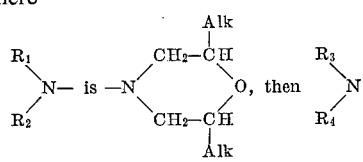

is from the class consisting of (1) dialkylamino groups in which each alkyl group contains 1 to 8 carbon atoms, (2) monoalkylamino groups in which one R is an α-branched-chain alkyl group of 3 to 8 carbon atoms and the other R is hydrogen, and (3) mono- and di-cycloalkylamino groups in which the cycloalkyl group contains 5 to 6 carbon atoms. When

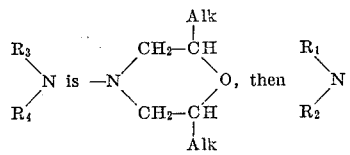

is from the class consisting of (1) dialkylamino groups in which each alkyl group contains 1 to 8 carbon atoms and (2) dicycloalkylamino groups in which each dicycloalkyl group contains 5 to 6 carbon atoms.

There are various known procedures for making thiocarbonyl sulfides. The followning procedures are illustrative of those that may be used in preparing the accelerators of this invention.

PREPARATION

The sodium or other alkali metal, alkaline earth metal or ammonium salt of the mono- or di-substituted dithiocarbamate may be made by mixing equivalent amounts of carbon disulfide and the appropriate amine in the presence of sodium hydroxide (or other suitable base) and water. To the resulting solution of dithiocarbamate salt is added additional mono- or di-substituted amine (which may be the same as or different from said "appropriate amine") and the mixture so produced is reacted, preferably at room temperature or slightly below (for example at 10° C. or higher), with an oxidizing agent such as an aqueous solution of iodine and potassium iodide, or sodium hypochlorite solution or other oxidizing agent known in the art for preparation of thiocarbonyl sulfides. The reaction can be carried out at temperatures up to 20 or 40° C., but the reaction is less clean cut at higher temperatures so that these are to be avoided. Oxidations using NaOCl are best carried out at 0 to 5° C., whereas oxidations with aqueous iodine and potassium iodide may be carried out at 20 to 40° C.

Example I

The following equation indicates the first general reaction:

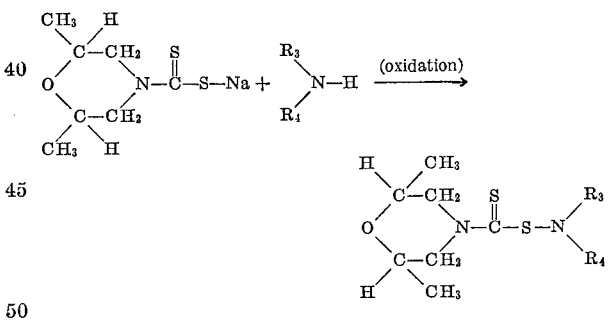

N,N-dialkylamino-2,6-dimethylmorpholino-thiocarbonyl sulfide 2,6-diethylmorpholine may be used instead of the 2,6-dimethyl derivative. Both R's may be alkyl groups of 1 to 8 carbon atoms; or one R may be hydrogen if the other R is an α-branched-chain alkyl group of 3 to 8 carbon atoms; or one or both R's may be cyclopentyl or cyclohexyl.

The reactants used were:

| | | |
|---|---|---|
| 2,6-dimethylmorpholine | g | 57.6 |
| CS$_2$ | g | 38.0 |
| NaOH | g | 20.0 |
| H$_2$O | ml | 800 |
| t-Butylamine | g | 182.5 |
| KI$_3$ $\begin{cases} I_2 \\ KI \\ H_2O \end{cases}$ | g g to ml | 128.2 128.8 800 |

The aqueous NaOH and 2,6-dimethylmorpholine were placed in a 2-liter flask. Carbon disulfide was added slowly, dropwise, at 25° C.±2° C. The yellow dithiocarbamate formed was dissolved in 800 ml. of water. The t-butylamine was then added all at once. The temperature rose to 34° C., and was returned to 20° C. by cooling. $KI_3$ addition was begun and a yellow liquid precipitated. On completion of the addition of the $KI_3$, stirring was continued for one hour and the organic and aqueous layers were separated and permitted to stand overnight. The organic layer was treated by addition of methanol at room temperature, which dissolved excess amine and other impurities and caused precipitation of the solid product. The light cream colored solid was filtered and recrystallized from methanol using a small amount of water to initiate crystallization. The product was N-t-butylamino-2,6-dimethylmorpholino-thiocarbonyl sulfide and had a melting point of 67–69° C.

Example II

The following equation indicates the second general reaction:

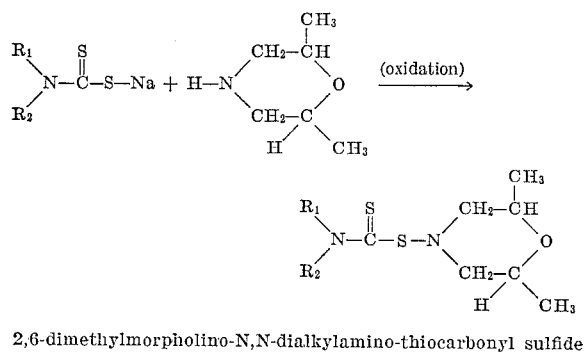

2,6-dimethylmorpholino-N,N-dialkylamino-thiocarbonyl sulfide 2,6-diethylmorpholine may be used instead of the 2,6-dimethyl derivative. Both R's may be alkyl groups of 1 to 8 carbon atoms; or both R's may be cyclopentyl or cyclohexyl.

The reactants used were:

| | |
|---|---:|
| Dimethylamine (40%) g | 450 |
| $CS_2$ g | 204 |
| NaOH g | 160 |
| $H_2O$ g | 2000 |
| 2,6-dimethylmorpholine g | 230.3 |
| $KI_3$ $\begin{cases} I_2 \text{ g} \\ KI \text{ g} \\ H_2O \text{ ml} \end{cases}$ | 1025.6<br>1030.4<br>6400 |

The dithiocarbamate was prepared in the usual manner. Four hundred fifty grams of 40 percent dimethylamine were used or 180.32 grams of the product on a 100 percent basis. The initial temperature was 25±2° C. Cooling was provided during the rapid addition of the 2,6-dimethylmorpholine to the dithiocarbamate solution, maintaining a temperature of 25 to 30° C. The $KI_3$ was added with stirring at 25 to 30° C. A precipitate formed soon after the $KI_3$ addition was started and continued during the run. The reaction mixture was allowed to stand over night. The precipitate was filtered, slurried and washed several times with water. Following this it was taken up in ether and filtered to remove impurities. The ether solution was evaporated and the residual solid taken up in warm methanol. Upon dilution with a small amount of water and standing overnight at 5° C. the desired product separated as a crystalline solid product and was filtered. A few small crystals of disulfide contamination were removed mechanically. The product was 2,6-dimethylmorpholino-N,N-dimethylaminothiocarbonyl-sulfide, melting point 102–105° C.

Representative compounds include the following:

2,6-dimethylmorpholino-N,N-diethylaminothiocarbonyl-sulfide
2,6-dimethylmorpholino-N,N-diisopropylaminothiocarbonyl-sulfide
2,6-dimethylmorpholino-N,N-di-n-propylaminothiocarbonyl-sulfide
2,6-dimethylmorpholino-N,N-di-n-hexylaminothiocarbonyl-sulfide
2,6-dimethylmorpholino-N,N-dimethylaminothiocarbonyl-sulfide
2,6-dimethylmorpholino-N,N-dicyclohexylaminocarbonyl-sulfide
2,6-dimethylmorpholino-N,N-di-n-butylaminocarbonyl-sulfide
N,N-dimethylamino-2,6-diethylmorpholinothiocarbonyl-sulfide
N,N-dimethylamino-2,6-dimethylmorpholinothiocarbonyl-sulfide
N,N-diethylamino-2,6-dimethylmorpholinothiocarbonyl-sulfide
N,N-di-n-butylamino-2,6-dimethylmorpholinothiocarbonyl-sulfide
N,N-di-n-hexylamino-2,6-dimethylmorpholinothiocarbonyl-sulfide
N,N-di-cyclohexylamino-2,6-dimethylmorpholinothiocarbonyl-sulfide
N,N-di-isopropylamino-2,6-dimethylmorpholinothiocarbonyl-sulfide
N-t-butylamino-2,6-dimethylmorpholinothiocarbonyl-sulfide
N-isopropylamino-2,6-dimethylmorpholinothiocarbonyl-sulfide
N-cyclohexylamino-2,6-dimethylmorpholinothiocarbonyl-sulfide
N,-1,1,3,3-tetramethylbutylamino-2,6-dimethylmorpholinothiocarbonyl-sulfide
N-isopropylamino-2,6-diethylmorpholinothiocarbonyl-sulfide
N-cyclohexylamino-2,6-diethylmorpholinothiocarbonyl-sulfide
N-t-butylamino-2,6-diethylmorpholinothiocarbonyl-sulfide
N-1,1,3,3-tetramethylbutylamino-2,6-diethylmorpholinothiocarbonyl-sulfide
2,6-diethylmorpholino-N,N-dimethylaminothiocarbonyl-sulfide
2,6-diethylmorpholino-N,N-diethylaminothiocarbonyl-sulfide
2,6-diethylmorpholino-N,N-di-n-hexylaminothiocarbonyl-sulfide
2,6-diethylmorpholino-N,N-dicyclohexylaminothiocarbonyl-sulfide The sulfides may be used as accelerators individually or in a mixture. They are used in the manner of other sulfenamide accelerators, in an amount such as employed with these other accelerators, viz. about 0.05 to 5 percent based on the weight of the rubber.

Experiment 1

The test data compare a natural rubber tread stock vulcanized with 2,6-methylmorpholino-N,N-dimethylaminocarbonyl sulfide (abbreviated to 4-(N,N-dimethyl)-2,6-DM) with the same stock vulcanized with the unsubstituted morpholine derivative 4-(N,N-dimethylthiocarbamoylthio)-morpholine (abbreviated to 4-(N,N-dimethyl)-DM).

The rubber was compounded as follows:

| | Parts |
|---|---:|
| Hevea rubber | 100 |
| HAF black | 50 |
| Zinc oxide | 3 |
| Softener | 3 |
| Stearic acid | 2.6 |
| Antioxidant | 1.8 |

Then 2.6 parts of sulfur were added together with one of the accelerators in the amount indicated; the stocks were cured at 300° C. and then tested for scorch resistance, with these results:

| Stock | A | B | C | D |
|---|---|---|---|---|
| 4-(N,N-dimethyl)-DM, parts | 0.3 | 0.4 | | |
| 4-(N,N-dimethyl)-2,6-DM, parts | | | 0.3 | 0.4 |
| Normal Stress Strain Cured at 300° F.: | | | | |
| 300% Modulus, p.s.i.: | | | | |
| 15 min | 1,800 | 2,150 | 1,800 | 2,000 |
| 30 min | 1,825 | 2,075 | 1,875 | 1,975 |
| 45 min | 1,900 | 1,975 | 1,775 | 1,850 |
| 60 min | 1,600 | 1,800 | 1,575 | 1,700 |
| Tensile Strength, p.s.i.: | | | | |
| 15 min | 4,000 | 4,025 | 4,000 | 4,125 |
| 30 min | 3,750 | 3,800 | 3,850 | 3,925 |
| 45 min | 3,800 | 3,950 | 3,775 | 3,800 |
| 60 min | 3,325 | 3,700 | 3,275 | 3,525 |
| Elongation, percent: | | | | |
| 15 min | 500 | 460 | 570 | 490 |
| 30 min | 480 | 460 | 490 | 480 |
| 45 min | 490 | 440 | 490 | 490 |
| 60 min | 480 | 490 | 470 | 480 |
| Mooney Scorch at 250° F.: | | | | |
| $T_s$ $(V_m+1)$ | 24 | 22 | 27.50 | 27 |
| $T_c$ $(V_m+10)$ | 30 | 27 | 34.50 | 32.5 |
| $V_m$ Min. Mooney | 24.50 | 25.25 | 23.50 | 24.25 |

In this and other tables:

$V_m$ = Mooney at minimum viscosity.

$T_s$ $(V_m+1)$ = Time to start of cure which is the time in minutes required for increase in the Mooney of the stock from minimum viscosity to 1 Mooney unit above minimum viscosity.

$T_c$ $(V_m+10)$ = Time to substantial cure which is the time in minutes required for increase in the Mooney of the stock from minimum viscosity to 10 Mooney units above minimum viscosity.

The above physical tests and Mooney scorch values indicate the following results:

The stocks shown are well cured with uniformly high modulus at the start as well as at longer cure times. The tensile strength has already reached its maximum so the shorter cures show a slight drop with increasing cure time, indicating sufficient acceleration. The Mooney scorch test results show that stocks C and D containing the accelerator of this invention have significantly and unexpectedly longer $T_s$, greater delayed action and scorch times than the stocks A and B from the unsubstituted morpholine compound. These $T_s$ differences are most important in that they provide longer safe processing periods to the rubber stock in manufacturing operations, making possible faster as well as higher temperature operations in the factory.

Experiment 2

A similar comparison was made in low-temperature SBR compounded as follows:

| | Parts |
|---|---|
| SBR 1500 | 100 |
| HAF black | 48 |
| Zinc oxide | 3 |
| Softener | 8 |
| Stearic acid | 2 |
| Antioxidant | 0.6 |
| Total | 161.6 |

Then 2 parts of sulfur was added together with one of the following accelerators in the amount indicated; the stocks were cured at 300° F., and then tested for scorch resistance, with these results:

| Stock | E | F | G | H |
|---|---|---|---|---|
| 4-(N,N-dimethyl)-DM, parts | 0.3 | 0.4 | | |
| 4-(N,N-dimethyl)-2,6-DM, parts | | | 0.3 | 0.4 |
| Normal Stress Strain Cured at 300° F.: | | | | |
| 300% Modulus, p.s.i.: | | | | |
| 15 min | 650 | 875 | 300 | 600 |
| 23 min | 1,250 | 1,525 | 900 | 1,275 |
| 30 min | 1,400 | 1,675 | 1,150 | 1,575 |
| 45 min | 1,600 | 1,850 | 1,350 | 1,700 |
| Tensile Strength, p.s.i.: | | | | |
| 15 min | 2,300 | 2,650 | 900 | 2,350 |
| 23 min | 3,325 | 3,550 | 1,500 | 3,550 |
| 30 min | 3,650 | 3,500 | 3,350 | 3,700 |
| 45 min | 3,500 | 3,650 | 3,400 | 3,675 |
| Elongation, percent: | | | | |
| 15 min | 680 | 670 | 720 | 720 |
| 23 min | 680 | 540 | 680 | 620 |
| 30 min | 620 | 500 | 640 | 550 |
| 45 min | 510 | 550 | 560 | 520 |
| Mooney Scorch at 275° F.: | | | | |
| $T_s$ $(V_m+1)$ | 19 | 19.5 | 23 | 22 |
| $T_c$ $(V_m+10)$ | 27 | 27.0 | 31 | 28.5 |
| $V_m$ Min. Mooney | 19.5 | 19.5 | 19 | 19.0 |

Results of the above tests show the physical properties of the slower curing SBR vulcanizates. The Mooney scorch test results show that stocks G and H containing the accelerators of this invention have significantly longer $T_s$, greater delayed action and scorch times than the stocks E and F containing the unsubstituted accelerator. These $T_s$ differences are particularly important in that they provide longer safe processing periods to the rubber stock in manufacturing operations. This also shows up in comparing the modulus and elongation figures at shorter cure times.

Tests were also made in natural rubber and low temperature SBR to compare N-t-butylamino-2,6-dimethylmorpholinothiocarbonyl sulfide (abbreviated to S - 2,6-DM - N,N - BH) and N - t - butylamino - morpholinocarbonyl sulfide (abbreviated to S-M-N,N-BH).

Experiment 3

| | Parts |
|---|---|
| Hevea rubber | 100 |
| HAF black | 50 |
| Zinc oxide | 3 |
| Softener | 3 |
| Stearic acid | 2.6 |
| Antioxidant | 1.8 |
| Total | 160.4 |

Then 2.6 parts of sulfur was added, together with one of the following accelerators in the amount indicated; the stocks were cured at 300° F., and then tested for scorch resistance, with these results:

| Stock | I | J | K | L |
|---|---|---|---|---|
| S-M-N,N-BH, parts | 0.3 | 0.4 | | |
| S-2,6-DM-N,N-BH, parts | | | 0.3 | 0.4 |
| Normal Stress Strain Cured at 300° F.: | | | | |
| 300% Modulus, p.s.i.: | | | | |
| 15 min | 2,000 | 2,225 | 1,875 | 2,050 |
| 23 min | 1,900 | 2,075 | 1,975 | 1,950 |
| 30 min | 1,775 | 1,875 | 1,900 | 1,900 |
| 45 min | 1,600 | 1,675 | 1,700 | 1,775 |
| Tensile Strength, p.s.i.: | | | | |
| 15 min | 3,925 | 4,125 | 3,900 | 3,850 |
| 23 min | 3,675 | 3,850 | 3,800 | 3,750 |
| 30 min | 3,675 | 3,725 | 3,700 | 3,675 |
| 45 min | 3,250 | 3,425 | 3,350 | 3,575 |
| Elongation, Percent: | | | | |
| 15 min | 520 | 510 | 530 | 490 |
| 23 min | 500 | 490 | 520 | 480 |
| 30 min | 500 | 500 | 510 | 500 |
| 45 min | 500 | 500 | 500 | 500 |
| Mooney Scorch at 250° F.: | | | | |
| $T_s$ $(V_m+1)$ | 22 | 21 | 23.5 | 23.5 |
| $T_c$ $(V_m+10)$ | 27 | 24.5 | 29.5 | 28.0 |
| $V_m$ (Min. Mooney) | 31.5 | 31.0 | 30.75 | 32.25 |

The normal stress-strain properties of stocks I to L inclusive, show equivalent states of cure for equal concentrations of the accelerators being compared. The Mooney Scorch test data show significant differences between the two accelerators in time to scorch, comparing stock I and K versus J and L. These differences representing delayed action times of the accelerators show the alkyl morpholine derivative stocks Q and L to have the improved processing characteristic of better accelerator delayed action most important in rubber manufacturing operations.

Experiment 4

The low-temperature SBR was compounded as before:

| | Parts |
|---|---|
| SBR | 100 |
| HAF black | 48 |
| Zinc oxide | 3 |
| Softener | 8 |
| Stearic acid | 2 |
| Antioxidant | 0.6 |
| Total | 161.6 |

Then 2 parts of sulfur was added together with one of the following accelerators in the amount indicated; the stocks were cured at 300° F., and then tested for scorch resistance with these results:

| Stock | M | N | O | P |
|---|---|---|---|---|
| S-M-N,N-BH, parts | 0.3 | 0.4 | | |
| S-2,6-DM-N,N-BH, parts | | | 0.3 | 0.4 |
| Normal Stress Strain Cured at 300° F.: | | | | |
| 300% Modulus, p.s.i.: | | | | |
| 15 min | 500 | 700 | 150 | 275 |
| 23 min | 1,325 | 1,650 | 1,000 | 1,300 |
| 30 min | 1,500 | 1,800 | 1,250 | 1,575 |
| 45 min | 1,600 | 1,925 | 1,500 | 1,775 |
| Tensile Strength, p.s.i.: | | | | |
| 15 min | 1,600 | 2,175 | 400 | 750 |
| 23 min | 3,525 | 3,650 | 3,925 | 3,400 |
| 30 min | 3,575 | 3,700 | 3,375 | 3,700 |
| 45 min | 3,650 | 3,475 | 3,600 | 3,600 |
| Elongation, Percent: | | | | |
| 15 min | 690 | 640 | 780 | 710 |
| 23 min | 590 | 530 | 650 | 590 |
| 30 min | 550 | 500 | 590 | 550 |
| 45 min | 520 | 450 | 550 | 490 |
| Mooney Scorch at 275° F.: | | | | |
| $T_s$ ($V_m$+1) | 21.0 | 21.5 | 24.5 | 23.0 |
| $T_c$ ($V_m$+10) | 28.5 | 29.5 | 33.0 | 33.0 |
| $V_m$ (Min. Mooney) | 21.5 | 21.5 | 21.5 | 21.5 |

The data in the above table show the initially slower curing characteristics of the stocks O and P containng the N-t-butylamino-2,6 - dimethylmorpholinothiocarbonyl sulfide in comparison to the unsubstituted morpholine compound. At optimum cure (longer) the properties of modulus, tensile strength and elongation are equivalent, illustrating the excellent delayed action of the accelerators of this invention. This data is also further substantiated by the Mooney scorch test data which show the longer $T_s$ or scorch times of the new accelerators. It is this property of longer scorch time which renders these materials so useful in the processes of rubber manufacture.

The various members of the new class of compounds are effective delayed-action vulcanization accelerators in rubber compounds, latex compounds or other conventional types of vulcanizable compounds of rubber, reclaimed rubber or synthetic rubber, and consistently produce very rapid curing compositions, which in the vulcanized state possess unusually high modulus, tensile and abrasion-resisting properties. The various diene synthetic rubbers vulcanizable by heating with sulfur are herein considered equivalent to natural rubber, examples being polybutadiene, polyisoprene, various copolymers of conjugated diolefins and vinyl compounds, such as SB–R (copolymer of butadiene and styrene) and NBR (copolymer of butadiene and acrylonitrile), copolymers of butadiene or isoprene with alpha-methylstyrene, ring-substituted styrenes, chloromethyl styrene, etc., butadiene-isoprene copolymer, isobutylene-isoprene, isobutylene-cyclopentadiene, vinyl-pyridines, etc. Although sulfur has hereinabove been mentioned as the preferred vulcanizing agent, sulfur-donor vulcanizing agents are contemplated. The amount of accelerator used is the usual amount which may vary from 0.05 to 5 parts per 100 parts of the rubber. The vulcanization is carried out at any usual vulcanization temperature.

The sulfides may be prepared by other methods than disclosed herein, although the method of oxidizing a mixture of a dithiocarbamate and an amine having a hydrogen atom attached to the nitrogen atom is preferred. However, the invention is not limited to accelerators prepared by any particular method, but includes the stated class of compounds, however they may have been formed.

It is possible to use other reactants than contemplated herein, and produce other accelerators such as that in which both of the

groups of the general formula are

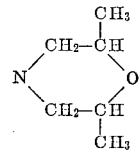

since these are commercially feasible.

What we claim is:

1. A compound of the formula

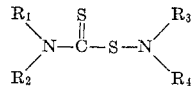

in which one of the groups

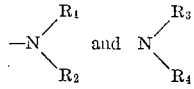

is

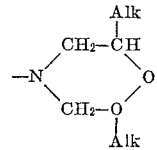

in which Alk stands for an alkyl group of 1 to 2 carbon atoms; and when

is

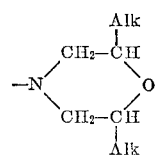

then

is from the class consisting of (1) dialkylamine groups in which each alkly group is of 1 to 8 carbon atoms, (2) monoalkylamino groups in which one or $R_3$ and $R_4$ is an alpha-branched-chain alkyl group of 3 to 8 carbon atoms and the other is hydrogen, and (3) mono- and di-cycloalkylamino groups in which the cycloalkyl group is of 5 to 6 carbon atoms; and when

is

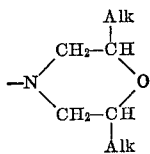

then

is from the class consisting of (1) dialkylamino groups in which each alkyl group is of 1 to 8 carbon atoms and (2) dicycloalkylamino groups in which each cycloalkyl group is of 5 to 6 carbon atoms.

2. A compound of claim 1 in which Alk is a methyl group and the substituents of the other nitrogen group are alkyl groups of 1 to 8 carbon atoms.

3. N,N - dialkylamino - 2,6 - dialkylmorpholinothiocarbonyl-sulfide in which each alkyl group contains 1 to 8 carbon atoms.

4. N - t - butylamino - 2,6 - dimethylmorpholinothiocarbonyl-sulfide.

5. 2,6 - dialkylmorpholino - N,N - dialkylaminothiocarbonyl-sulfide in which each alkyl group is of 1 to 8 carbon atoms.

6. The compound of claim 5 in which each alkyl group is methyl.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |

OTHER REFERENCES

Gorelic et al.: Chemical Abstracts, vol. 61, p. 5609($d$) (1964).

NICHOLAS S. RIZZO, *Primary Examiner.*

JOSE TOVAR, *Assistant Examiner.*

U.S. Cl. X.R.

260—246, 79.5, 94.4, 84.3, 82.7, 77.5

UNITED STATES PATENT OFFICE
CERTIFICATE OF CORRECTION

Patent No. 3,417,086  Dated December 17, 1968

Inventor(s) George E. P. Smith, Jr. and Wendell S. Cook

It is certified that error appears in the above-identified patent and that said Letters Patent are hereby corrected as shown below:

Col. 2, line 6, "follownig" should read --following--

Col. 8, line 66, "alkly" should read --alkyl--
(claim 1)
line 67, "or" should read --of--

SIGNED AND
SEALED
MAR 3 - 1970

(SEAL)
Attest:

Edward M. Fletcher, Jr.
Attesting Officer

WILLIAM E. SCHUYLER, JR
Commissioner of Patents